(12) United States Patent
Qi

(10) Patent No.: US 10,835,966 B1
(45) Date of Patent: Nov. 17, 2020

(54) DOOR LOCK SET INSTALLATION KIT

(71) Applicant: Tech-Tool Sourcing Company Limited, Shanghai (CN)

(72) Inventor: An Qi, Shanghai (CN)

(73) Assignee: Tech-Tool Sourcing Company Limited, Shanghai (CN)

( * ) Notice: Subject to any disclaimer, the term of this patent is extended or adjusted under 35 U.S.C. 154(b) by 0 days.

(21) Appl. No.: 16/541,179

(22) Filed: Aug. 15, 2019

(51) Int. Cl.
B23B 47/28 (2006.01)

(52) U.S. Cl.
CPC ........ B23B 47/287 (2013.01); *B23B 2247/06* (2013.01); *B23B 2247/08* (2013.01); *B23B 2247/12* (2013.01); *Y10T 408/567* (2015.01)

(58) Field of Classification Search
CPC ... B23B 47/287; B23B 49/02; B23B 2247/06; B23B 2247/08; B23B 2247/12; B23B 47/281; Y10T 408/5653; Y10T 408/5665; Y10T 408/567; Y10T 408/568; Y10T 408/563; Y10T 408/5635; Y10T 408/97; E05B 17/06
USPC .......................................................... 33/194
See application file for complete search history.

(56) References Cited

U.S. PATENT DOCUMENTS

| | | |
|---|---|---|
| 4,715,125 A | 12/1987 | Livick |
| 5,569,001 A | 10/1996 | Brutscher et al. |
| 6,390,738 B1 * | 5/2002 | Fridman ............... B23B 47/287 408/103 |
| 6,398,465 B1 | 6/2002 | Monge |
| 6,910,837 B2 | 6/2005 | Trettin et al. |
| 6,994,498 B2 | 2/2006 | Trettin et al. |
| D521,330 S | 5/2006 | Thomas |
| 7,073,991 B2 | 7/2006 | Thomas |
| 7,112,014 B2 | 9/2006 | Thomas |
| 7,210,880 B2 | 5/2007 | Snider et al. |
| 7,316,527 B2 | 1/2008 | Trettin et al. |
| 8,443,523 B2 * | 5/2013 | Lam ....................... E05B 17/06 33/194 |
| 9,403,219 B2 | 8/2016 | Trettin et al. |
| 2005/0129472 A1 * | 6/2005 | Liu ........................ E05B 17/06 408/115 R |
| 2007/0041800 A1 | 2/2007 | Santos |

* cited by examiner

*Primary Examiner* — Eric A. Gates
*Assistant Examiner* — Chwen-Wei Su
(74) *Attorney, Agent, or Firm* — Corporate IP Consultants, LLC

(57) ABSTRACT

A kit for assisting in the location of holes to be drilled in a door of a thickness between 1⅜" to 1¾" for the installation of a conventional lock set at a backset of either 2⅜" or 2¾" with no additional hardware and without damaging the door. A first guide plate defines a first hole saw guide. A second guide plate is attachable to the first guide plate in one of two orientations and defines a second hole saw guide. At least one clamping member is carried by the second guide plate and extends substantially parallel to the first guide plate. Each of the first guide plate and the clamping member define opposing biasing members such that when mounted on a door, the door is centered within the kit.

20 Claims, 7 Drawing Sheets

DOOR LOCK SET INSTALLATION KIT

CROSS-REFERENCE TO RELATED APPLICATIONS

NONE

FIELD OF THE DISCLOSURE

The present disclosure relates to the installation of a conventional lockset on a conventional door. More specifically, the present disclosure relates to a device for assisting a user in simultaneously locating a first opening in the side of a conventional door for receiving a cylinder or tumbler of a conventional lockset and a second opening in the distal edge of the conventional door for receiving a latch or bolt of the of the conventional lockset. The present invention includes first and second hole saw guides for further assisting the user in drilling the first and second through holes once their position has been located.

BACKGROUND OF THE DISCLOSURE

Doors are often sold without door lock hardware and without the apertures required to install the door lock hardware. Typically, installing the door lock hardware requires the drilling or boring of a front face hole that passes through the door and an end wall hole that is perpendicular to the front face hole and intersects the front face hole. Locating these holes can be difficult and can require a number of measurements. In addition, it can be difficult to position the two holes at the proper elevation.

SUMMARY OF EXEMPLARY EMBODIMENTS OF THE DISCLOSURE

A door lock set installation kit (or "kit"), and more specifically a kit for assisting in the location of holes to be drilled in a door for the installation of a conventional lock set is disclosed. The door lock set installation kit may be used on doors of varying thicknesses such as those having a conventional thickness of from approximately one and three eighths inches (1⅜") to approximately one and three quarters inches (1¾"). The lock set may also be selectively backset from the edge of the door at a conventional distance of either two and three eighths inches (2⅜") or two and three quarters inches (2¾").

The kit is generally configured to be releasably received on the distal edge of a conventional door at a selected elevation. The kit is configured to be releasably received on the conventional door without requiring any additional hardware in a manner that does not damage the door. Further, the kit is configured to assist a user in locating a first through hole to extend between the first and second sides of the door at the selected elevation and setback, as well as a second through hole to extend from the distal edge of the door and to the first through opening. The first through hole is configured to receive the cylinder of a conventional lockset, and the second through hole is configured to receive the latch assembly or bolt.

The kit comprises essentially three components—a first guide plate configured to engage the first side of the door, a second guide plate releasably attachable to the first guide plate and configured to engage the distal edge of the door, and at least one clamping member carried by the second guide plate and extending substantially parallel to and spaced apart from the first guide plate in order to engage the second side of the door. Each of the first guide plate and the at least one clamping member define respective first and second biasing members extending into the interior of the kit so that when mounted on a door, the door is centered within the kit.

The first guide plate includes a first hole saw guide for locating and drilling an opening in the door between the first and second surfaces thereof. The first hole saw guide is hingedly attached to the first guide plate along a distal edge via a hinge. The hinge is substantially U-shaped having a base integrally formed with a substantial portion of the width of the first guide plate, and each end being integrally attached to the first hole saw guide. The hinge is biased toward the first surface of the first guide plate, which is oriented toward the interior of the assembled kit. The hinge is provided such that the first hole saw guide engagement surface closely engages the first surface of the door when the assembled kit is received on a door of any thickness. The first hole saw guide defines a cylindrical wall opening having a center axis disposed orthogonally to the plane defined by the first hole saw guide engagement surface and intersecting the longitudinal axis of the first guide plate. The cylindrical wall is dimensioned to closely receive a conventional hole saw for cutting the first through hole.

The first guide plate further defines a linear channel for receiving a rail defined by the second guide plate. The rail is engageable within the linear channel in one of two selected orientations in order to position one of a first engagement surface and a second engagement surface in the interior of the kit in order to accomplish a selected distance from the selected engagement surface and the center of the first hole saw guide, which defines the backset.

The second guide plate defines a second hole saw guide between the oppositely disposed first and second engagement surfaces, at a center thereof. When the kit is selectively mounted on a door as described above, the second hole saw guide is properly registered at a selected elevation on the distal edge thereof to allow the user to drill the second through opening.

Two clamping members are illustrated as being pivotally received on the second side of the second guide plate. Each clamping member is rotated such that regardless of the orientation of the second guide plate, the clamping members may be oriented in the same direction as the first guide plate with respect to the second guide plate to define the interior of the kit. In this orientation, the first and second biasing members are positioned relative to each other such that when the kit is selectively mounted on a door, the door is centered between the first guide plate and the clamping members such that the center of the second hole saw guide is centered between the first and second sides of the door.

BRIEF DESCRIPTION OF THE DRAWINGS

The foregoing and other objects of the present disclosure will be apparent upon consideration of the following detailed description, taken in conjunction with the accompanying drawings and claims, in which like reference characters refer to like parts throughout, and in which:

DETAILED DESCRIPTION OF EXEMPLARY EMBODIMENTS OF DISCLOSURE

Figure 1:
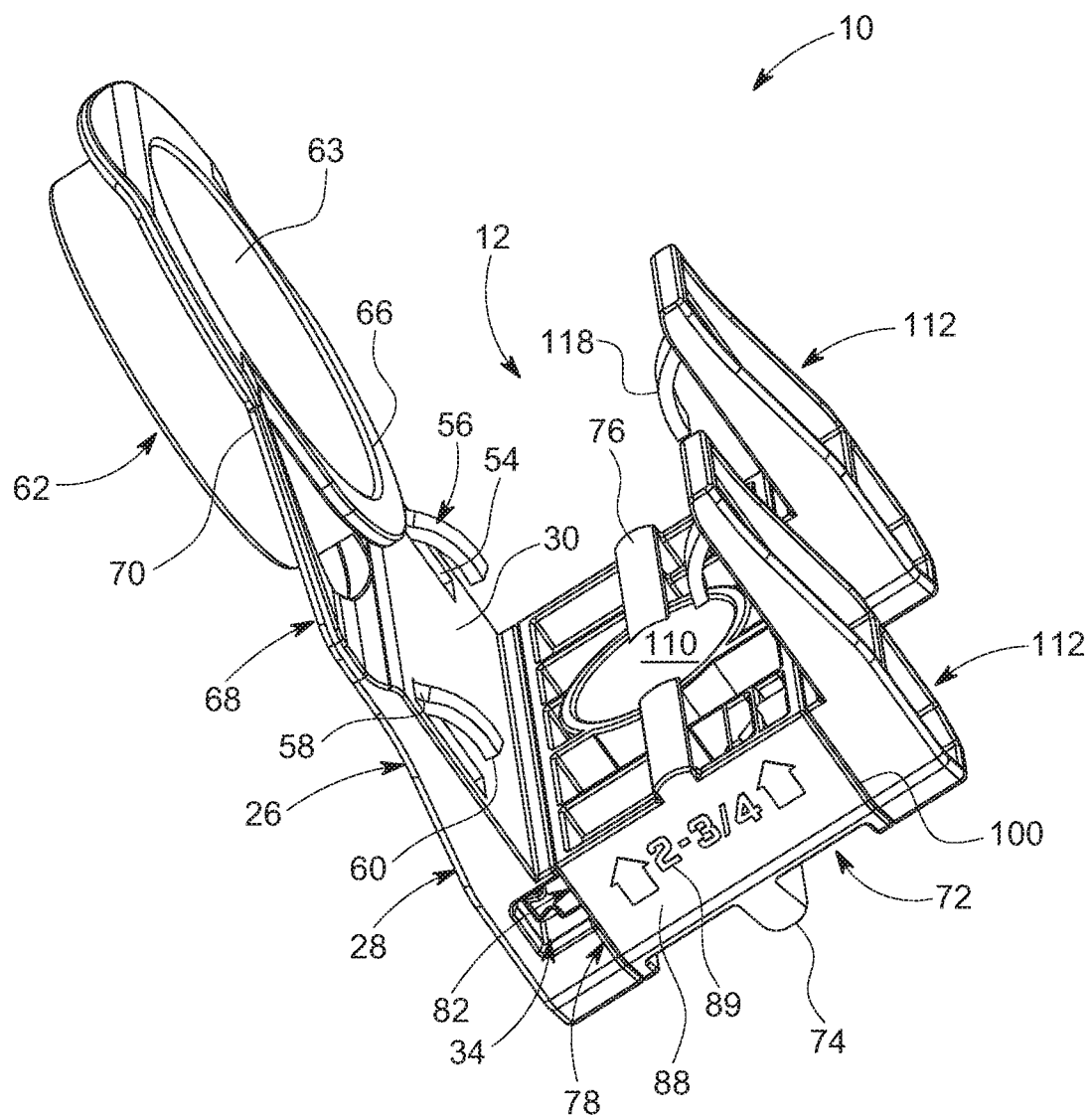
FIG. 1 is a perspective view of the door lock set installation kit of the present invention.

The present invention is a door lock set installation kit 10, and more specifically a kit for assisting in the location of holes 22,24 to be drilled in a door 14 for the installation of a conventional lock set including either a door lock or door knob (hereinafter referred to simply as "lock set"), not illustrated. The door lock set installation kit 10 may be used on doors 14 of varying thicknesses such as those having a conventional thickness of from approximately one and three eighths inches (1⅜") to approximately one and three quarters inches (1¾"). The lock set may also be selectively backset from the edge 20 of the door 14 at a conventional distance of either two and three eighths inches (2⅜") or two and three quarters inches (2¾"). However, it will be understood that the dimensions provided in this application are for illustration purposes only, and the present invention is not limited thereto.

The invention is a door lock set installation kit, or kit 10, is generally configured to be releasably received on the distal edge 20 of a conventional door 14 defining first and second sides 16,18, a proximal edge (not illustrated) along which the door 14 is hinged to a frame, and the distal edge 20. The kit 10 is configured to be releasably received on the conventional door 14 without requiring any additional hardware such as screws, and in a manner that does not damage the door 14. Further, the kit 10 is configured to assist a user in locating a first through hole 22 to extend between the first and second sides 16,18 of the door 14 at a selected elevation and setback, as well as a second through hole 24 to extend from the distal edge 20 of the door 14 and the first through hole 22. The first through hole 22 is configured to receive the cylinder or tumbler (not shown) of a conventional lockset. The second through hole 24 is configured to receive the latch assembly or bolt (not shown) of a conventional locket.

Figure 2:
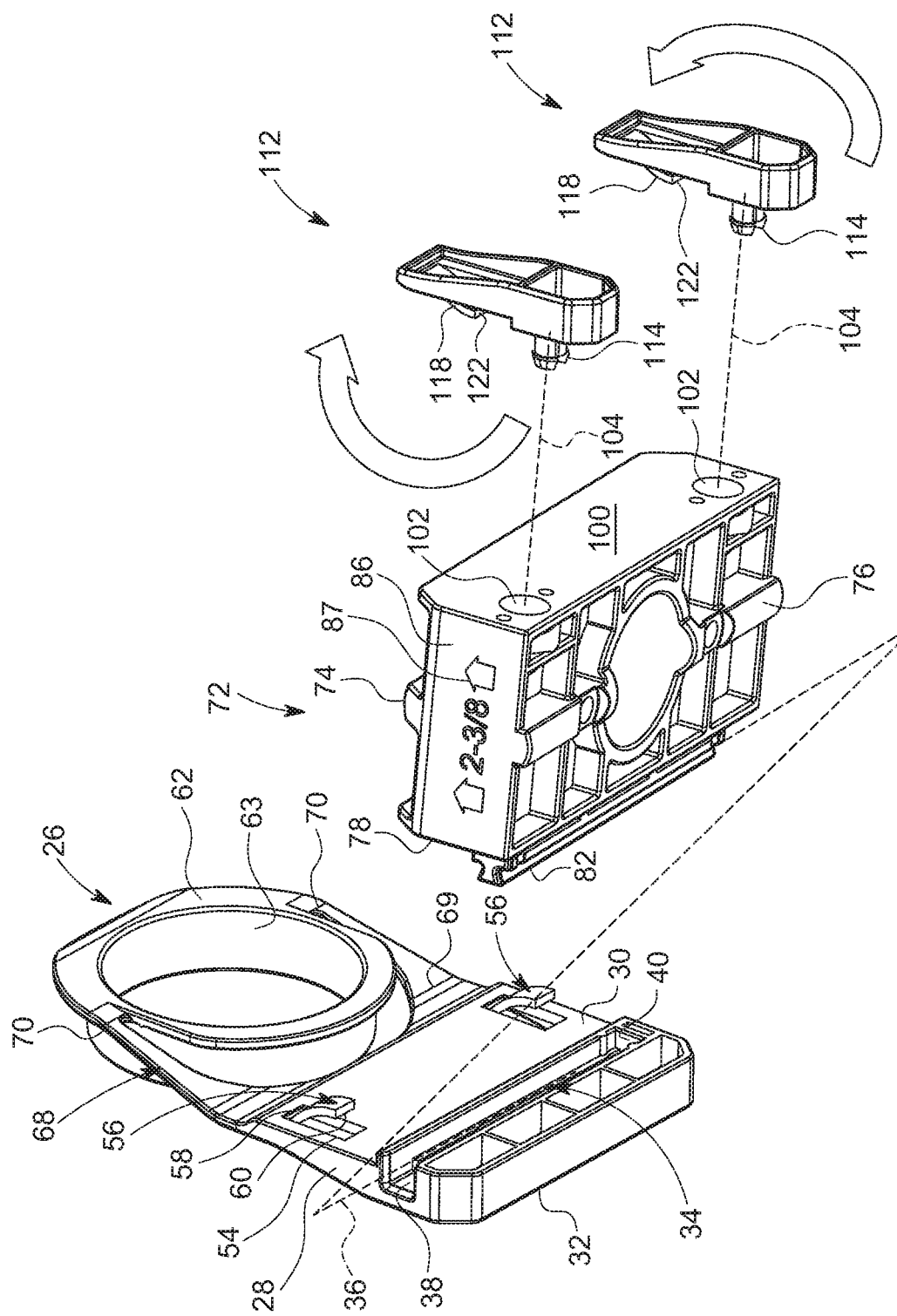
FIG. 2 is an exploded view, shown in perspective, of the door lock kit of the present invention.

As illustrated in FIG. 1, the kit 10 comprises essentially three components, namely a first guide plate 26 configured to engage the first side 16 of the door 14, a second guide plate 72 releasably attachable to the first guide plate 26 and configured to engage the distal edge 20 of the door 14, and at least one clamping member 112 carried by the second guide plate 72 and extending substantially parallel to and spaced apart from the first guide plate 26 in order to engage the second side 18 of the door 14. In the illustrated embodiment, two clamping members 112 are illustrated. However, it will be understood by those skilled in the art that more or fewer than two clamping members 112 may be included to accomplish the same function as the two clamping members 112 illustrated and disclosed herein. When assembled as illustrated in FIG. 1, the kit 10 defines an interior 12 for receiving the conventional door 14. FIG. 2 illustrates the first and second guide plates 26,72 and two clamping members 112 in exploded view.

Figure 4:
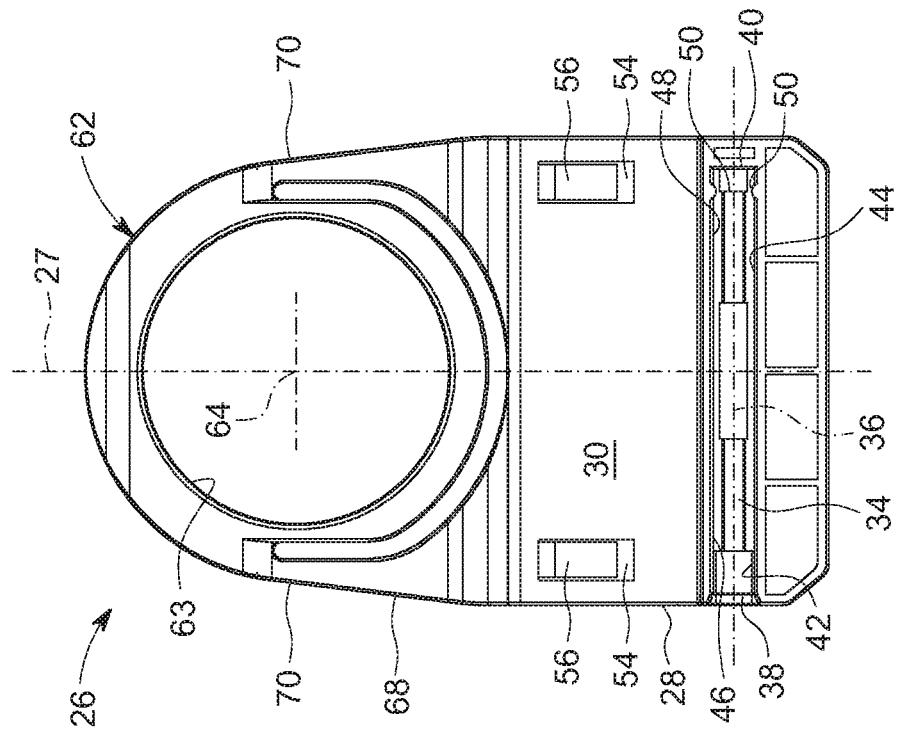
FIG. 4 is a front elevation view of the first guide plate of FIG. 3.
Figure 3:
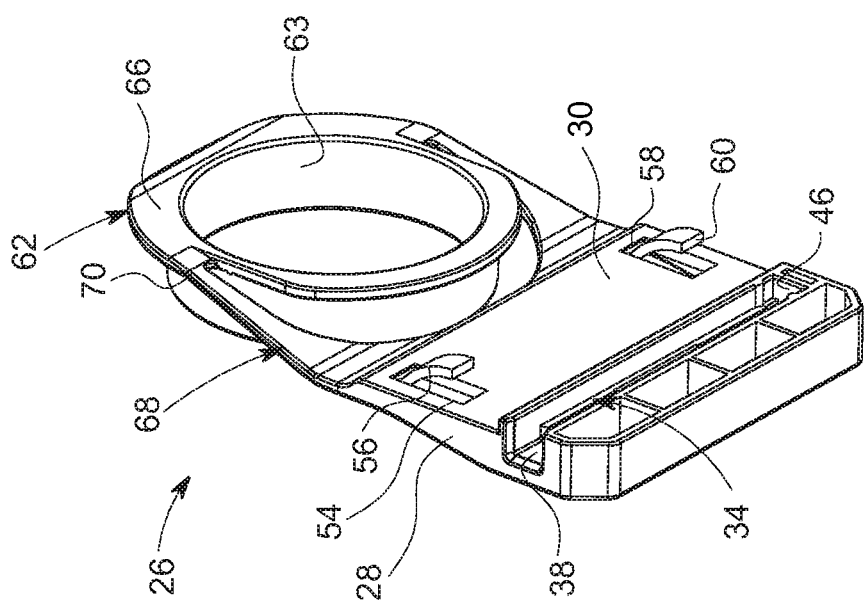
FIG. 3 is a perspective view of the first guide plate of the door lock set installation kit of the present invention.
Figure 5:
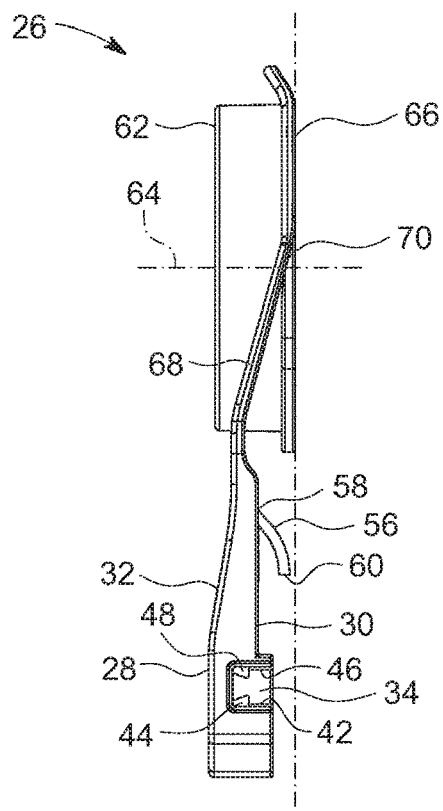
FIG. 5 is a side elevation view of the first guide plate of FIG. 3.

The first guide plate 26 is illustrated in greater detail in FIGS. 3-5. The first guide plate 26 defines a main body 28 having a first surface 30 and a second surface 32, the first surface 30 being disposed on an interior 12 of the kit 10, and the second surface 32 being opposed to the first surface 30. A first mating portion 34 is defined by the first guide plate 26 on the first surface 30 thereof for cooperating with a second mating portion 82 defined by the second guide plate 72, which will be described in more detail below. In the illustrated embodiment as best illustrated in FIG. 4, the first mating portion 34 is a linear channel defining a longitudinal axis 36 oriented in a transverse direction across the first guide plate 26 and perpendicular to a longitudinal axis 27 of the first guide plate 26. The linear channel 34 defines an open first end 38 and a closed second end 40. In this embodiment, the second mating portion 82 is a rail configured to be closely received within the linear channel 34. The linear channel open first end 38 and the rail 82 are each configured such that the rail 82 is closely and slidably received within the linear channel 34. In the preferred embodiment, the first and second mating portions 34,82 are keyed such that relative movement between the first and second guide plates 26,72 is limited to linear movement along the axis 36 of the linear channel 34 and the rail 82.

The first guide plate main body 28 further defines at least one first biasing member 56 configured to engage the first side 16 of the door 14. As will be described in greater detail below with respect to the at least one clamping members 112, the at least one first biasing member 56 is provided for securing the kit 10 on the door. In the illustrated embodiment, two first biasing members 56 are provided, with one each being disposed proximate either side of the first guide plate main body 28. Each first biasing member 56 is a leaf spring integrally formed with, and within an opening 54 defined by, the first guide plate main body 28. Each first biasing member 56 defines a first end 58 integrally formed with the first guide plate main body 28 and a second end 60 extending away from the first guide plate first surface 30 and into the interior of the kit 10.

A first hole saw guide 62 for drilling the first through hole 22 in the door 14 between the first and second sides 16,18 thereof is carried by the first guide plate 26. In the illustrated embodiment, the first hole saw guide 62 is hingedly attached to the first guide plate 26 along an edge opposite the linear channel 34 via a hinge 68. The hinge 68 is substantially U-shaped having a base 69 integrally formed with a substantial portion of the width of the first guide plate 26, and each end 70 being integrally attached to the first hole saw guide 62. As best illustrated in FIG. 5, the hinge 68 is biased toward the first surface 30 of the first guide plate 26, which is oriented toward the interior 14 of the assembled kit 10. As illustrated, the first hole saw guide 62 defines an engagement surface 66 that is disposed substantially co-planar with the second end 60 of the first biasing members 56. It will be seen that the hinge 68 is provided such that the first hole saw guide engagement surface 66 closely engages the first side 16 of the door 14 when the assembled kit 10 is received on a door 14 of any thickness. In the above example of two doors 14 defining thicknesses of 1⅜" and 1¾", it will be understood that the hinge 68 and the first biasing members 56 will be displaced a small amount when the assembled kit 10 is mounted on a door 14 having a thickness of 1⅜", and will deflect an additional 3/16" when mounted on a door 14 having a thickness of 1¾". The 3/16" difference is equal to one half of the difference between 1⅜" and 1¾". The first hole saw guide 62 defines a cylindrical wall opening 63 having a center axis 64 disposed orthogonally to the plane defined by the first hole saw guide engagement surface 66 and intersecting the longitudinal axis 27 of the first guide plate 26. The cylindrical wall opening 63 is dimensioned to closely receive a conventional hole saw (not illustrated) for cutting the first through hole 22 in the door 22 from the first side 16 to and through the second side 18 thereof. For example, a standard dimension for the first through hole 22 is 2⅛".

Figure 6:
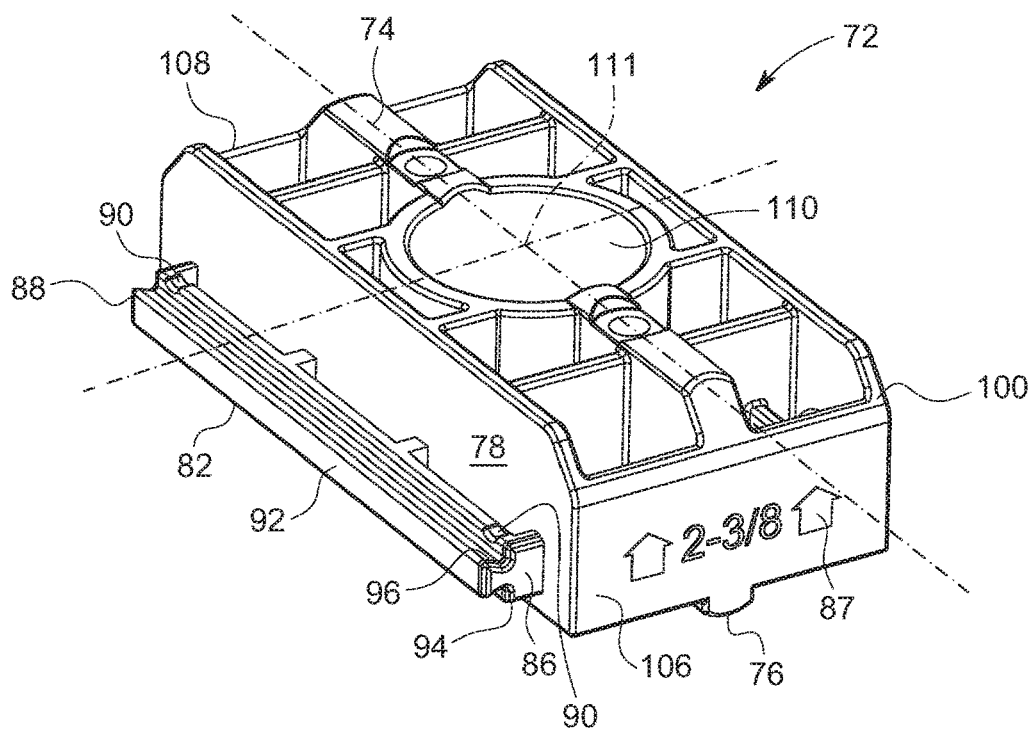
FIG. 6 is a perspective view of the second guide plate of the door lock set installation kit of the present invention.
Figure 7:
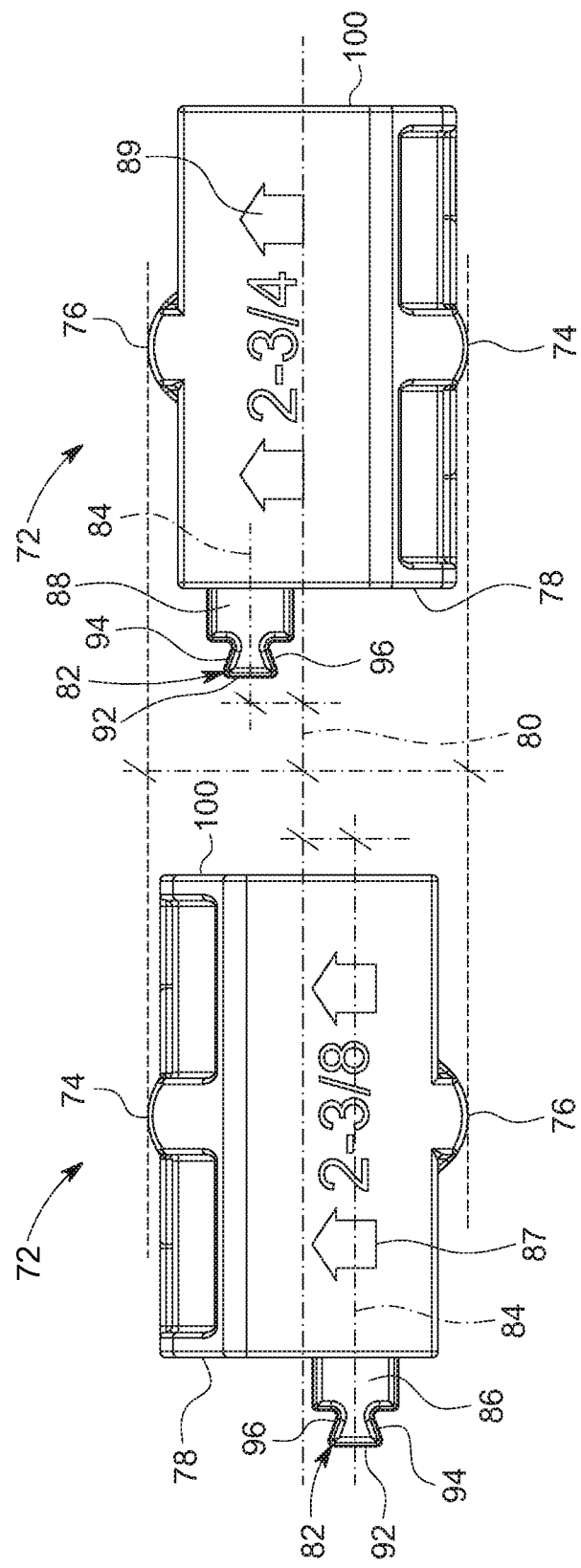
FIG. 7 is an end elevation view of the second guide plate of FIG. 6 shown in first and second orientations.
Figure 8:
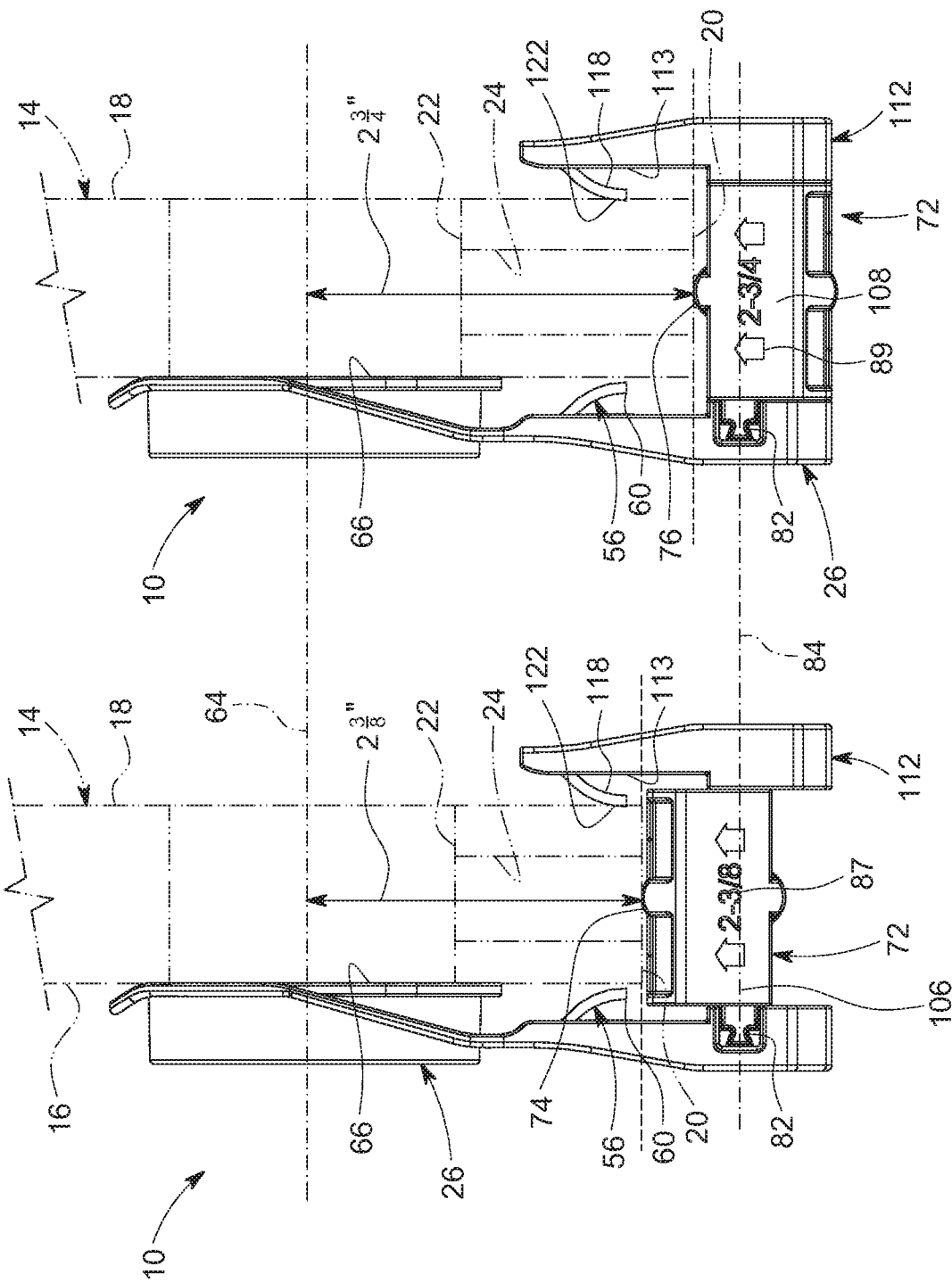
FIG. 8 is a side elevation view of the door lock set installation kit of the present invention showing the second guide plate in first and second orientations, the door lock set installation kit being illustrated as receiving a conventional door.

The second guide plate 72 is best illustrated in FIGS. 6-8. Referring to FIG. 6, the second guide plate 72 is defined by oppositely disposed first and second engagement surfaces 74,76, oppositely disposed first and second sides 78,100, and oppositely disposed first and second ends 106,108. The rail 82 disclosed above is carried on the first side 78 of the second guide plate 72. The rail 82 is disposed parallel to and offset from a midline 80 of the first side 78. As discussed above, the kit 10 is designed to locate the first through hole 22 at a selected backset, for example either 2⅜" or 2¾". To accomplish this, the second guide plate 72 is selectively oriented in one of two orientations such that the rail 82 is received in the linear channel 34 in one of two orientations. Thus, the offset of the rail 82 from the midline 80 a distance of one-half (½) the difference of the two backsets. In the illustrated embodiment, the offset is equal to 3/16" (½*(2¾"–2⅜")). Referring to FIG. 7, the offset is illustrated for each of the two orientations of the second guide plate 72, which is to be further disclosed below. In a first orientation for the shallower backset, the rail 82 is positioned below the midline 80, as illustrated on the left. In a second orientation for the deeper backset, the rail 82 is positioned above the midline 80, as illustrated on the right.

As illustrated in FIG. 8, when the second guide plate 72 is engaged with the first guide plate 26 in a first orientation (illustrated on the left), the first engagement surface 74 is positioned a first distance from the center axis 64 of the first hole saw guide 62. In the illustrated embodiment, the first distance is 2⅜". When the second guide plate 72 is engaged with the first guide plate 26 in a second orientation (illustrated on the right), the second engagement surface 76 is positioned a second distance from the center axis 64 of the first hole saw guide 62. In the illustrated embodiment, the second distance is 2¾". In either embodiment, when the selected backset is chosen, the second guide plate 72 is oriented according to the selected backset, and the kit 10 is installed on the door 14 at a selected elevation, the center axis 64 of the first hole saw guide 62 is properly registered to allow the user to drill the first through hole 22.

The rail 82 defines a first end 86 terminating a first distance from the second guide plate first end 106, and a second end 88 terminating the first distance from the second guide plate second end 108. The first distance is dimensioned such that the rail 82 is centered with the linear channel 34 and, as a result, the second guide plate 72 is aligned with the first guide plate 26 in either orientation of the second guide plate 72. A detent 90 is defined on each side of the rail 82, and at each of the first and second ends 86,88 thereof. Referring to FIG. 4, the linear channel 34 of the illustrated embodiment defines first and second interior sidewalls 42,46, and a protrusion 50 is defined on at least one of the first and second interior sidewalls 42,46 proximate the closed second end 40 of the linear channel 34 to cooperate with the rail detents 90 in order to prevent unselected removal of the second guide plate 72 from the first guide plate 26. It will be understood that other engagement mechanisms may be provided, including relocating the detents 90 and cooperating protrusions 50 illustrated herein. In the illustrated embodiment, the rail 82 and linear channel 34 are keyed in order to prevent unselected removal of the second guide plate 72 from the first guide plate 26. To that end, a distal face 92 of the rail defines a keystone configuration defining opposing first and second channels 94,96 extending from the first rail end 86 to the second rail end 88. Referring to FIG. 5, the first and second interior sidewalls 42,46 of the linear channel 34 defines first and second linear extensions 44,48, respectively, configured to be engaged within the first and second channels 94,96 in order to limit movement of the rail 82 within the linear channel 34 to movement along the longitudinal axis 36 of the linear channel 34.

Further as illustrated in FIG. 6, a second hole saw guide 110 is defined between the oppositely disposed first and second engagement surfaces 74,76, at a center thereof. When the kit 10 is selectively mounted on a door 14 as described above, the second hole saw guide 110 is properly registered at a selected elevation on the distal edge 20 thereof to allow the user to drill the second through hole 24.

Referring to FIG. 2, the second side 100 of the second guide member 72 defines a receptor 102 for mounting each clamping member 112. In the illustrated embodiment having two clamping members 112, the second guide member second side 100 defines two receptors 102. Each clamping member 112 defines a post 114 extending from a first side 113 thereof, the post 114 being configured to be closely received within the receptor 102. In the illustrated embodiment, each receptor 102 and post 114 defines a circular configuration such that the clamping member 112 is allowed to rotate about an axis 104 of the receptor 102 and post 114. However, it will be understood that the receptor 102 and post 114 may be keyed to prevent rotation, but configured such that the clamping member 112 may be selectively removed from the receptor 102, reoriented in a second direction about the axis 104, and reinstalled within the receptor 102. In order to ensure that the first and second biasing members 56,118 are opposed to each other in either orientation of the second guide plate 72, the center axis 104 of the receptors 102, and thus the clamping member posts 114, are coplanar with a midline 84 of the rail 82.

Figure 9:
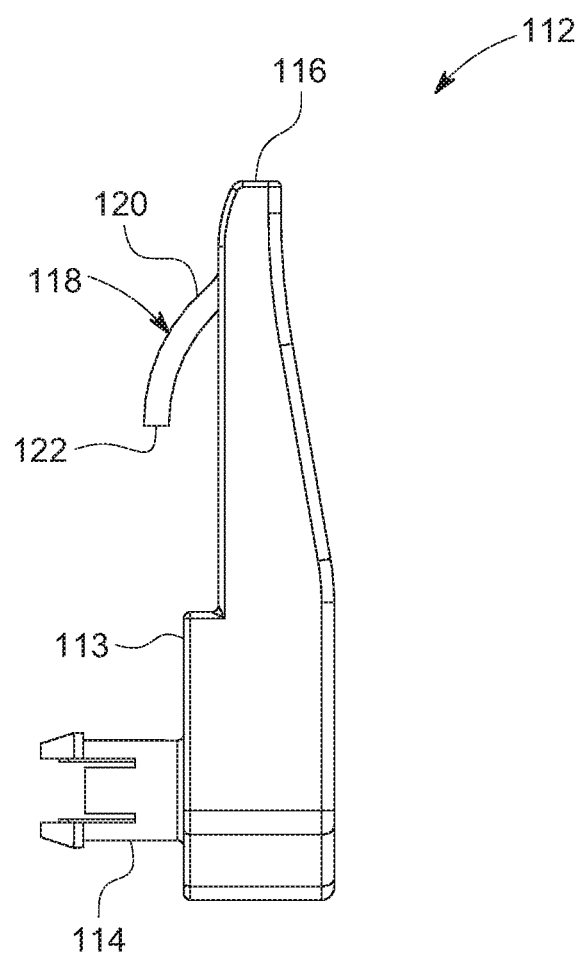
FIG. 9 is a side elevation view of the clamping member of the door lock set installation kit of the present invention.

Referring to FIG. 9, the clamping member 112 defines a second biasing member 118 for securing the kit 10 on the door 14. In the illustrated embodiment, the second biasing member 118 is disposed proximate a distal end 115 of the clamping member 112. The second biasing member 1118 is a leaf spring integrally formed with, and within an opening 116 defined by, the clamping member 112. The second biasing member 118 defines a first end 120 integrally formed with the clamping member 112 and a second end 122 extending away from the clamping member 112 and into the interior 12 of the kit 10. As illustrated in FIG. 8, the second biasing member 118 is preferably disposed opposite a first biasing member 56 when installed on a door 14. The first and second biasing members 56,118 thus serve to center the door 14 between first guide plate 26 and the clamping members 112 such that the center of the door 14 is aligned with the center axis 111 of the second hole saw guide 110.

Having described the structure of the present invention, the method of using the kit 10 is as follows. The user first determines the desired backset of the lockset, either 2¾" or 2⅜". The user then orients the second guide plate 72 such that the selected one of the first and second engagement surfaces 74,76 is oriented toward the interior 12 of the kit 10. For ease of use, indicia 87,89 is placed at each of the first and second end faces 86,88 indicating which of the engagement surfaces 74,76 is correct for the selected backset. After orienting the second guide plate 72, the rail 82 is inserted into the first guide plate linear channel 34 until the engagement mechanism 50,90 is engaged. Each of the clamping members 112 is then oriented in the direction of the first guide plate 26 such that the first and second biasing members 56,118 are aligned. In the illustrated embodiment, this is accomplished by rotating each clamping member 112. A selected elevation is then chosen and marked on the door 14 and the kit 10 is positioned on the door 14 at the selected elevation. The first and second biasing members 556,118, as well as the first hole saw guide 62 serve to hold the kit 10 in place while the user drills a first through hole 22 using a conventional hole saw positioned in the first hole saw guide 62, and then a second through hole 24 using a second conventional hole saw positioned in the second hole saw guide 110. After the first and second through holes 22,24 are formed, the kit 10 is slid away from and off of the door 14.

The foregoing merely illustrates the principles of the disclosure. Various modifications and alterations to the described embodiments will be apparent to those skilled in the art in view of the teachings herein. It will thus be appreciated that those skilled in the art will be able to devise numerous apparatuses, arrangements, manufacture and methods which, although not explicitly shown or described herein, embody the principles of the disclosure and are thus within the spirit and scope of the disclosure. The disclosures of all documents and publications cited herein are hereby incorporated herein by reference in their entireties.

What is claimed is:

1. A door lock set installation kit for assisting a user in preparing a conventional door for the installation of a conventional lockset, the conventional door defining opposing first and second surfaces and a distal edge, said kit for simultaneously locating a first hole at a selected backset with respect to the distal edge to extend between the first and second surfaces for receiving a cylinder or tumbler of the conventional lockset and a second opening to extend between the distal edge and the first hole and centered between the first and second surfaces for receiving a latch or bolt of the conventional lockset, the door lock installation kit comprising:
   a first guide plate defining:
      a main body having a first surface configured to engage the conventional door first surface;
      a first mating portion defined by said first guide plate on said main body first surface;
      at least one first biasing member configured to engage the conventional door first surface; and
      a first hole saw guide carried along a top edge of said first guide plate main body, said first hole saw guide being configured to register with the first hole and defining a through opening configured to closely receive a conventional hole saw for cutting the first hole;
   a second guide plate releasably attachable to said first guide plate in one of a first orientation and a second orientation and configured to engage the distal edge of the door, said second guide plate defining:
      oppositely disposed first and second engagement surfaces, and a midline disposed between said first and second engagement surfaces to bisect said second guide plate;
      oppositely disposed first and second sides; and
      oppositely disposed first and second ends
      a second mating portion carried by said first side for selectively engaging said first mating portion when said second guide plate is in either of said first orientation or said second orientation, said first engagement surface being disposed to engage the conventional door distal edge when said second guide plate is disposed in said first orientation, wherein said first engagement surface is disposed a first distance from a center of said first hole saw guide to define a first backset distance, and wherein said second engagement surface being disposed to engage the conventional door distal edge when said second guide plate is disposed in said second orientation, said second engagement surface being disposed a second distance from said center of said first hole saw guide to define a second backset distance, wherein said second mating portion is offset from said midline such that said first distance and said second distance are not equal;
   a second hole saw guide defined between said oppositely disposed first and second engagement surfaces, at a center thereof, said second hole saw guide located to properly register the second hole on the conventional door distal edge; and
   at least one clamping member carried by said second guide plate in a selected one of a first clamp orientation and a second clamp orientation, said at least one clamping member being oriented in said first clamp orientation and extending in the same direction as and parallel to said first guide plate when said second guide plate is disposed in said first orientation, and said at least one clamping member being oriented in said second clamp orientation and extending in the same direction as and parallel to said first guide plate when said second guide plate is disposed in said second orientation when said second guide plate is disposed in said second orientation.

2. The door lock set installation kit of claim 1:
   wherein said first mating portion is a linear channel defining a longitudinal axis oriented in a transverse direction across said first guide plate and perpendicular to a longitudinal axis of said first guide plate, said linear channel defining an open first end and a closed second end, said linear channel further defining a first keyed portion; and
   wherein said second mating portion is a rail configured to be closely and slidably received within said linear channel through said open first end, said second mating portion defining a second keyed portion configured to engage said first mating portion to limit relative movement of said rail to linear movement along said longitudinal axis of said linear channel.

3. The door lock set installation kit of claim 2 wherein said rail defines a first end terminating a first distance from said second guide plate first end, and a second end terminating said first distance from said second guide plate second end, said first distance being dimensioned such that said rail is centered within said linear channel when said rail is received with said linear channel in either of said first orientation of said second guide plate and said second orientation of said second guide plate.

4. The door lock set installation kit of claim 2:
   wherein said rail defines a first side and a second side, said rail further defines at least one detent disposed on at least one of said first side and said second side of said rail; and
   wherein said linear channel defines a first interior side wall and a second interior side wall, said linear channel further defining at least one protrusion on at least one of said first interior side wall and said second interior sidewall, said at least one detent and said at least one protrusion being relatively positioned to engage when said rail is received within said linear channel in either of said first orientation of said second guide plate and said second orientation of said second guide plate to assist in maintaining engagement of said first guide plate and said second guide plate.

5. The door lock set installation kit of claim 1 wherein said first backset distance is two and three-eighths inches (2⅜") and said second backset distance is two and three-quarters inches (2¾").

6. The door lock set installation kit of claim 1:
wherein said first guide plate further defines at least one first biasing member; and
wherein each of said at least one clamping member defines a second biasing member, each of said at least one first biasing members being positioned and configured to cooperate with second biasing member of one of said at least one clamping member in order to center the conventional door with respect to said second hole saw guide defined by said second guide plate.

7. The door lock set installation kit of claim 6:
wherein said first guide plate defines at least one through opening for receiving said at least one first biasing member, said first biasing member defining a leaf spring defining a first end integrally formed with said first guide plate main body and a second end extending away from said first guide plate first surface and toward said at least one clamping member; and
wherein each of said at least one clamping member defines a through opening for receiving said second biasing member, said second biasing member defining a leaf spring defining a first end integrally formed with said clamping member and a second end extending away from said at least one clamping member and toward said first guide plate.

8. The door lock set installation kit of claim 1 wherein said first guide plate further defines a hinge for hingeably connecting said first hole saw guide to said first guide plate top edge, said hinge defining a substantially U-shaped configuration having a base integrally formed with at least a portion of a width of said first guide plate top edge, and defining two spaced apart ends extending away from said first guide plate main body, said first hole saw guide being disposed between and integrally formed with said two spaced apart ends, said hinge being biased toward said first surface of said first guide plate, said first hole saw guide defining an engagement surface for engaging one of the first and second surfaces of the conventional door.

9. The door lock set installation kit of claim 1:
wherein each of said at least one clamping member defines an elongated body having a first side disposed facing said first guide plate, a proximal end, and a distal end, each of said at least one clamping member further defining a male connecting member extending from said proximal end of said first side; and
wherein said second side of said second guide plate defines at least one receptor configured to receive said male connecting member of each of said at least one clamping member in each of said first clamp orientation and said second clamp orientation.

10. The door lock set installation kit of claim 9 wherein each said at least one receptor defines a substantially circular configuration defining a central axis in order to allow said at least one clamping member to be selectively rotated about said central axis between said first clamp orientation and said second clamp orientation.

11. The door lock set installation kit of claim 10 wherein said receptor central axis and a centerline of said second mating portion carried by said second guide plate are coplanar.

12. A door lock set installation kit for assisting a user in preparing a conventional door for the installation of a conventional lockset, the conventional door defining opposing first and second surfaces and a distal edge, said kit for simultaneously locating a first hole at a selected backset with respect to the distal edge to extend between the first and second surfaces for receiving a cylinder or tumbler of the conventional lockset and a second opening to extend between the distal edge and the first hole and centered between the first and second surfaces for receiving a latch or bolt of the conventional lockset, the door lock installation kit comprising:
a first guide plate defining:
a main body having a first surface configured to engage the conventional door first surface;
a linear channel defined by said first guide plate on said main body first surface, said linear channel defining a longitudinal axis oriented in a transverse direction across said first guide plate and perpendicular to a longitudinal axis of said first guide plate, said linear channel defining an open first end and a closed second end, said linear channel further defining a first keyed portion;
at least one first biasing member configured to engage the conventional door first surface;
a first hole saw guide carried along a top edge of said first guide plate main body, said first hole saw guide being configured to register with the first hole and defining a through opening configured to closely receive a conventional hole saw for cutting the first hole; and
at least one first biasing member;
a second guide plate releasably attachable to said first guide plate in one of a first orientation and a second orientation and configured to engage the distal edge of the door, said second guide plate defining:
oppositely disposed first and second engagement surfaces, and a midline disposed between said first and second engagement surfaces to bisect said second guide plate;
oppositely disposed first and second sides; and
oppositely disposed first and second ends
a rail carried by said first side for selectively engaging said linear channel when said second guide plate is in either of said first orientation or said second orientation, said rail configured to be closely and slidably received within said linear channel through said open first end, said rail defining a second keyed portion configured to engage said linear channel to limit relative movement of said rail to linear movement along said longitudinal axis of said linear channel, said first engagement surface being disposed to engage the conventional door distal edge when said second guide plate is disposed in said first orientation, wherein said first engagement surface is disposed a first distance from a center of said first hole saw guide to define a first backset distance, and wherein said second engagement surface being disposed to engage the conventional door distal edge when said second guide plate is disposed in said second orientation, said second engagement surface being disposed a second distance from said center of said first hole saw guide to define a second backset distance, wherein said second mating portion is offset from said midline such that said first distance and said second distance are not equal;

a second hole saw guide defined between said oppositely disposed first and second engagement surfaces, at a center thereof, said second hole saw guide located to properly register the second hole on the conventional door distal edge; and at least one clamping member carried by said second guide plate in a selected one of a first clamp orientation and a second clamp orientation, said at least one clamping member being oriented in said first clamp orientation and extending in the same direction as and parallel to said first guide plate when said second guide plate is disposed in said first orientation, and said at least one clamping member being oriented in said second clamp orientation and extending in the same direction as and parallel to said first guide plate when said second guide plate is disposed in said second orientation when said second guide plate is disposed in said second orientation, each of said at least one clamping member further defining a second biasing member, each of said at least one first biasing members being positioned and configured to cooperate with second biasing member of one of said at least one clamping member in order to center the conventional door with respect to said second hole saw guide defined by said second guide plate.

13. The door lock set installation kit of claim 12 wherein said rail defines a first end terminating a first distance from said second guide plate first end, and a second end terminating said first distance from said second guide plate second end, said first distance being dimensioned such that said rail is centered within said linear channel when said rail is received with said linear channel in either of said first orientation of said second guide plate and said second orientation of said second guide plate.

14. The door lock set installation kit of claim 12:
wherein said rail defines a first side and a second side, said rail further defines at least one detent disposed on at least one of said first side and said second side of said rail; and
wherein said linear channel defines a first interior side wall and a second interior side wall, said linear channel further defining at least one protrusion on at least one of said first interior side wall and said second interior sidewall, said at least one detent and said at least one protrusion being relatively positioned to engage when said rail is received within said linear channel in either of said first orientation of said second guide plate and said second orientation of said second guide plate to assist in maintaining engagement of said first guide plate and said second guide plate.

15. The door lock set installation kit of claim 12 wherein said first backset distance is two and three-eighths inches (2⅜") and said second backset distance is two and three-quarters inches (2¾").

16. The door lock set installation kit of claim 12:
wherein said first guide plate defines at least one through opening for receiving said at least one first biasing member, said first biasing member defining a leaf spring defining a first end integrally formed with said first guide plate main body and a second end extending away from said first guide plate first surface and toward said at least one clamping member; and
wherein each of said at least one clamping member defines a through opening for receiving said second biasing member, said second biasing member defining a leaf spring defining a first end integrally formed with said clamping member and a second end extending away from said at least one clamping member and toward said first guide plate.

17. The door lock set installation kit of claim 12 wherein said first guide plate further defines a hinge for hingeably connecting said first hole saw guide to said first guide plate top edge, said hinge defining a substantially U-shaped configuration having a base integrally formed with at least a portion of a width of said first guide plate top edge, and defining two spaced apart ends extending away from said first guide plate main body, said first hole saw guide being disposed between and integrally formed with said two spaced apart ends, said hinge being biased toward said first surface of said first guide plate, said first hole saw guide defining an engagement surface for engaging one of the first and second surfaces of the conventional door.

18. The door lock set installation kit of claim 12:
wherein each of said at least one clamping member defines an elongated body having a first side disposed facing said first guide plate, a proximal end, and a distal end, each of said at least one clamping member further defining a male connecting member extending from said proximal end of said first side; and
wherein said second side of said second guide member defines at least one receptor configured to receive said male connecting member of each of said at least one clamping member in each of said first clamp orientation and said second clamp orientation.

19. The door lock set installation kit of claim 18 wherein each said at least one receptor defines a substantially circular configuration defining a central axis in order to allow said at least one clamping member to be selectively rotated about said central axis between said first clamp orientation and said second clamp orientation.

20. The door lock set installation kit of claim 18 wherein said receptor central axis and a centerline of said second mating member carried by said second guide plate are coplanar.

* * * * *